(12) United States Patent
Tada

(10) Patent No.: US 11,052,907 B2
(45) Date of Patent: Jul. 6, 2021

(54) PARKING CONTROL DEVICE AND PARKING CONTROL METHOD

(71) Applicant: Panasonic Intellectual Property Management Co., Ltd., Osaka (JP)

(72) Inventor: Yusaku Tada, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 247 days.

(21) Appl. No.: 16/284,040

(22) Filed: Feb. 25, 2019

(65) Prior Publication Data

US 2019/0184983 A1 Jun. 20, 2019

Related U.S. Application Data

(63) Continuation-in-part of application No. PCT/JP2017/033805, filed on Sep. 20, 2017.

(30) Foreign Application Priority Data

Sep. 30, 2016 (JP) .............................. JP2016-194610

(51) Int. Cl.
*B60W 30/06* (2006.01)
*G08G 1/14* (2006.01)
(Continued)

(52) U.S. Cl.
CPC ............. *B60W 30/06* (2013.01); *G08G 1/143* (2013.01); *B60W 2420/54* (2013.01);
(Continued)

(58) Field of Classification Search
CPC ............. B60W 30/06; B60W 2420/54; B60W 2710/207; B60W 2720/10; G08G 1/143;
(Continued)

(56) References Cited

U.S. PATENT DOCUMENTS

2008/0010018 A1 1/2008 Satonaka et al.
2009/0128364 A1* 5/2009 Lee .................... G01S 15/931
340/932.2
(Continued)

FOREIGN PATENT DOCUMENTS

JP 2006-193014 7/2006
JP 2009-500225 1/2009

OTHER PUBLICATIONS

International Search Report of PCT application No. PCT/JP2017/033805 dated Dec. 26, 2017.
(Continued)

*Primary Examiner* — Hunter B Lonsberry
*Assistant Examiner* — Jay Khandpur
(74) *Attorney, Agent, or Firm* — Greenblum & Bernstein, P.L.C.

(57) ABSTRACT

A parking control device includes a detector and a determiner. The detector receives, from an ultrasonic sensor which transmits an ultrasonic wave and receives a reflected wave corresponding to the ultrasonic wave, a signal based on the reflected wave. The detector further detects a detection point group being an aggregate of a plurality of detection points of two parked vehicle groups adjacent to a parking space between the two parked vehicle groups, based on the signal. The determiner determines whether the parking space is an end-on parking space or a parallel parking space based on a position of at least a depression shape in at least a contour pattern being a pattern of the detection point group.

6 Claims, 12 Drawing Sheets

(51) Int. Cl.
    *G08G 1/16*     (2006.01)
    *G06K 9/00*     (2006.01)
    *G01S 15/931*   (2020.01)
(52) U.S. Cl.
    CPC ... *B60W 2710/207* (2013.01); *B60W 2720/10* (2013.01); *G01S 2015/932* (2013.01); *G01S 2015/933* (2013.01); *G06K 9/00812* (2013.01); *G08G 1/14* (2013.01); *G08G 1/168* (2013.01)
(58) Field of Classification Search
    CPC .... G08G 1/168; G08G 1/14; G01S 2015/932; G01S 2015/933; G06K 9/00812
    See application file for complete search history.

(56) References Cited

U.S. PATENT DOCUMENTS

| | | | |
|---|---|---|---|
| 2011/0022269 A1* | 1/2011 | Nakazono | G08G 1/14 701/41 |
| 2018/0180731 A1* | 6/2018 | Inoue | G01S 13/87 |

OTHER PUBLICATIONS

Notice of Reasons for Refusal in Japan dated Apr. 28, 2020 for the related Japanese Patent Application No. 2016-194610.

* cited by examiner

PARKING CONTROL DEVICE AND PARKING CONTROL METHOD

CROSS-REFERENCE TO RELATED APPLICATIONS

This application is a continuation-in-part of the PCT International Application No. PCT/JP2017/033805 filed on Sep. 20, 2017, which claims the benefit of foreign priority of Japanese patent application No. 2016-194610 filed on Sep. 30, 2016, the contents all of which are incorporated herein by reference.

BACKGROUND

1. Technical Field

The present disclosure relates to a parking control device, and a parking control method that detect a parking space.

2. Description of the Related Art

A parking control device that detects a parking space (hereinafter referred to as an empty space) with the use of an ultrasonic sensor (i.e., a sonar) mounted to a vehicle, such as an automobile, is known. The parking control device causes the ultrasonic sensor to transmit ultrasonic waves (transmission waves) from a side of the vehicle and detects an empty space based on the ultrasonic waves (i.e., reflected waves) received by the ultrasonic sensor.

For example, PTL 1 discloses a technique in which a plurality of detection points (hereinafter referred to as a detection point group) surrounding a vehicle that is in a parked state (hereinafter referred to as a parked vehicle) is detected based on reflected waves and the type of the parking space is determined based on the detection point group. The type of parking space is either a parking space for parallel parking (hereinafter referred to as a parallel parking space) or a parking space for end-on parking (or perpendicular parking) (hereinafter referred to as an end-on parking space).

CITATION LIST

Patent Literature

PTL 1: Japanese Translation of PCT Publication No. 2009-500225

SUMMARY

The present disclosure provides a parking control device and a parking control method that accurately determine whether a parking space is an end-on parking space or a parallel parking space.

A parking control device according to the present disclosure includes a memory that stores instructions, and a processor that, when executing the instructions stored in the memory, performs operations. The operations includes: receiving, from an ultrasonic sensor which transmits an ultrasonic wave and receives a reflected wave corresponding to the ultrasonic wave, and is to be mounted to a vehicle, a signal based on the reflected wave; detecting a detection point group being an aggregate of a plurality of detection points of reflection positions of the reflected wave, based on the signal; determining whether an empty parking space between two parked vehicle groups adjacent to the empty parking space is an end-on parking space or a parallel parking space based on a position of at least a depression shape in at least a contour pattern being a pattern of the detection point group; and outputting a determination result indicating whether the empty parking space is the end-on parking space or the parallel parking space to a device that generates an instruction to be used for controlling the vehicle when the vehicle parks into the empty parking space, or generating the instruction based on the determination result, and outputting the instruction to a vehicle controller that controls at least a traveling direction and a speed of the vehicle.

A parking control method according to the present disclosure includes a receiving step, a detecting step, a determining step and an outputting step. In the receiving step, a signal based on a reflected wave is received from an ultrasonic sensor which transmits an ultrasonic wave and receives the reflected wave corresponding to the ultrasonic wave and is to be mounted to a vehicle. In the detecting step, a detection point group is detected, based on the signal. The detection point group is an aggregate of a plurality of detection points of reflection positions of the reflected wave. In the determining step, whether the empty parking space between two parked vehicle groups adjacent to the empty parking space is an end-on parking space or a parallel parking space is determined, based on a position of at least a depression shape in at least a contour pattern being a pattern of the detection point group. In the outputting step, a determination result indicating whether the empty parking space is the end-on parking space or the parallel parking space is output to a device that generates an instruction to be used for controlling the vehicle when the vehicle parks into the empty parking space, or the instruction is output to a vehicle controller that controls at least a traveling direction and a speed of the vehicle after generating the instruction based on the determination result.

Any combination of aspects of the present disclosure, including those converted among methods, devices, recording media (including non-transitory computer-readable storage media), computer programs, and the like, is also effective as an aspect of the present disclosure.

According to the present disclosure, which a parking space is an end-on parking space or a parallel parking space is accurately determined.

DETAILED DESCRIPTION OF PREFERRED EMBODIMENTS

Prior to describing exemplary embodiments of the present disclosure, problems with conventional technology will be described briefly. In the technology disclosed in PTL 1, there is room for improvement in determining whether a parking space is an end-on parking space or a parallel parking space. For example, when an end-on parking space that can accommodate two or more vehicles side by side is empty, it is unable to accurately determine whether the empty parking space is an end-on parking space or a parallel parking space, according to the technology disclosed in PTL 1.

In contrast, according to the technology of the present disclosure, whether the parking space is an end-on parking space or a parallel parking space can be determined more accurately.

Hereafter, exemplary embodiments of the present disclosure will be described with reference to the drawings.

Figure 1:
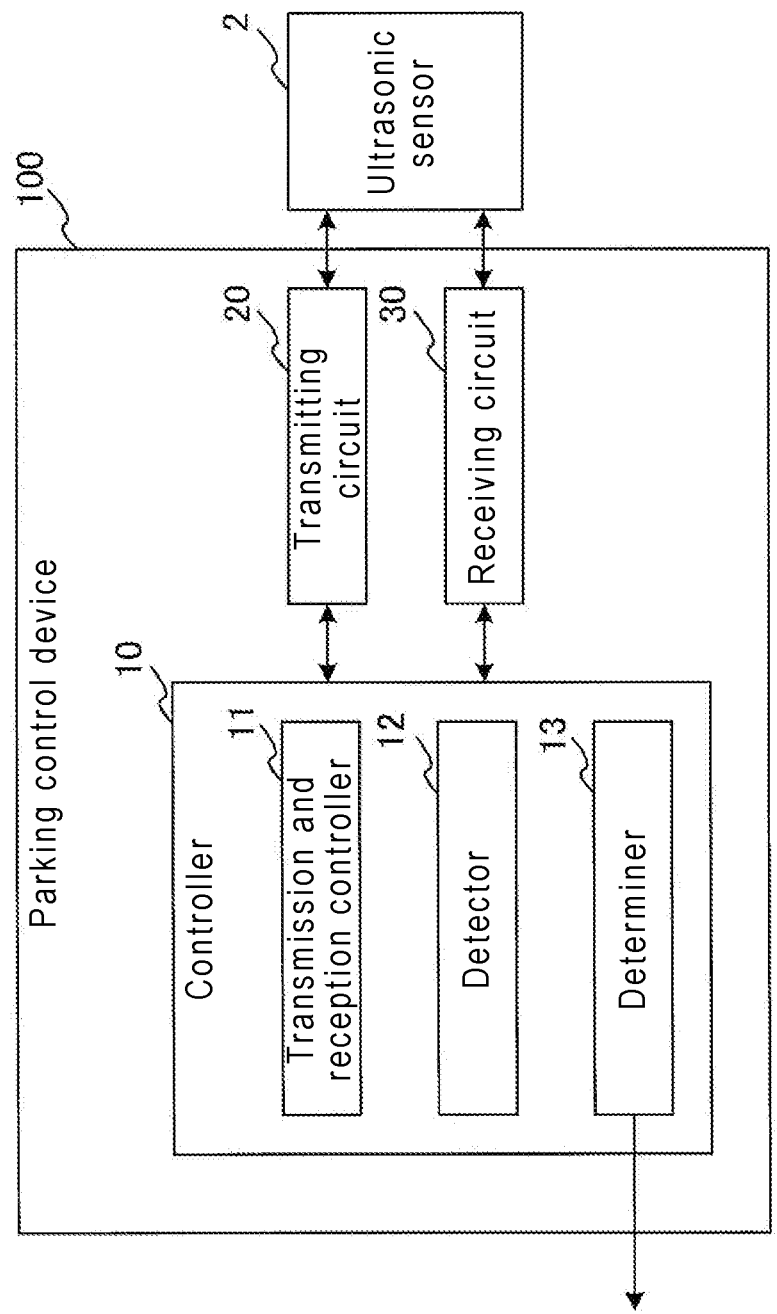
FIG. 1 is a block diagram illustrating an example of the configuration of a parking control device according to an exemplary embodiment of the present disclosure.

The configuration of parking control device 100 according to an exemplary embodiment of the present disclosure will be described with reference to FIG. 1. FIG. 1 is a view illustrating an example of the configuration of parking control device 100 according to the present exemplary embodiment.

Parking control device 100 shown in FIG. 1 is incorporated in vehicle 1 (see FIG. 2), such as an automobile, and is electrically connected to ultrasonic sensor 2 mounted to vehicle 1.

Figure 2:
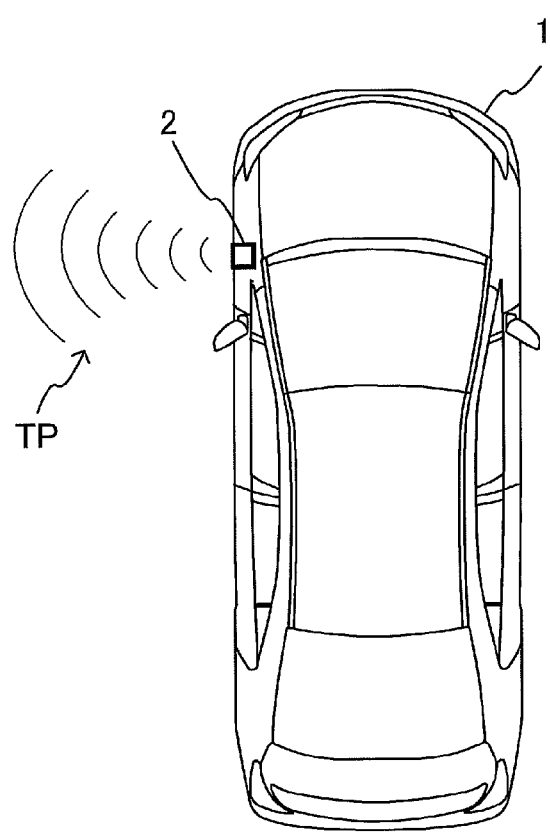
FIG. 2 is a view for illustrating an example of a mounting position of the ultrasonic sensor shown in FIG. 1.

Ultrasonic sensor 2 is mounted on, for example, a side of vehicle 1, as illustrated in FIG. 2. Ultrasonic sensor 2 transmits transmission wave TP that is an ultrasonic wave from the side of vehicle 1. Transmission wave TP is reflected by an obstacle that reflects ultrasonic waves. Then, ultrasonic sensor 2 receives the reflected wave (not shown) of transmission wave TP.

Note that although ultrasonic sensor 2 is mounted only on the left side of vehicle 1 in FIG. 2, ultrasonic sensor 2 may be mounted also on the right side of vehicle 1. A plurality of ultrasonic sensors 2 may be provided on the left side or the right side of vehicle 1.

In addition, although the present exemplary embodiment describes an example in which parking control device 100 and ultrasonic sensor 2 are incorporated in vehicle 1, parking control device 100 and ultrasonic sensor 2 may be incorporated in a movable-body apparatus other than the vehicle (automobile).

As illustrated in FIG. 1, parking control device 100 includes controller 10, transmitting circuit 20, and receiving circuit 30.

Transmitting circuit 20 is configured to include, for example, an oscillation circuit (not shown) and a drive circuit (not shown). The oscillation circuit generates a rectangular wave with a predetermined frequency. The drive circuit outputs the generated rectangular wave as a drive signal to ultrasonic sensor 2. This enables ultrasonic sensor 2 to transmit transmission wave TP that is an ultrasonic wave at a predetermined transmission voltage gain (also referred to as transmission gain).

Receiving circuit 30 is configured to include an amplifier circuit (not shown) and a filter circuit (not shown). The amplifier circuit amplifies the information (electric signal) of the reflected wave received from ultrasonic sensor 2 by a predetermined reception signal gain (also referred to as reception gain). The filter circuit filters the amplified electric signal to convert it to a reception signal and outputs the reception signal to controller 10.

Controller 10 includes transmission and reception controller 11, detector 12, and determiner 13. Although not shown in the drawings, controller 10 includes, for example, a CPU (Central Processing Unit), a memory storage medium such as a ROM (Read Only Memory) that stores a control program, a working memory such as a RAM (Random Access Memory), and a communication circuit. The functions of transmission and reception controller 11, detector 12, and determiner 13 shown in FIG. 1 (the details of which will be described later) are implemented by execution of a control program by the CPU.

Transmission and reception controller 11 outputs a control signal to each of transmitting circuit 20 and receiving circuit 30. The control signal that is output to transmitting circuit 20 includes, for example, an instruction of the above-described transmission voltage gain. The control signal that is output to receiving circuit 30 includes, for example, an instruction of the above-described reception signal gain.

Figure 3:
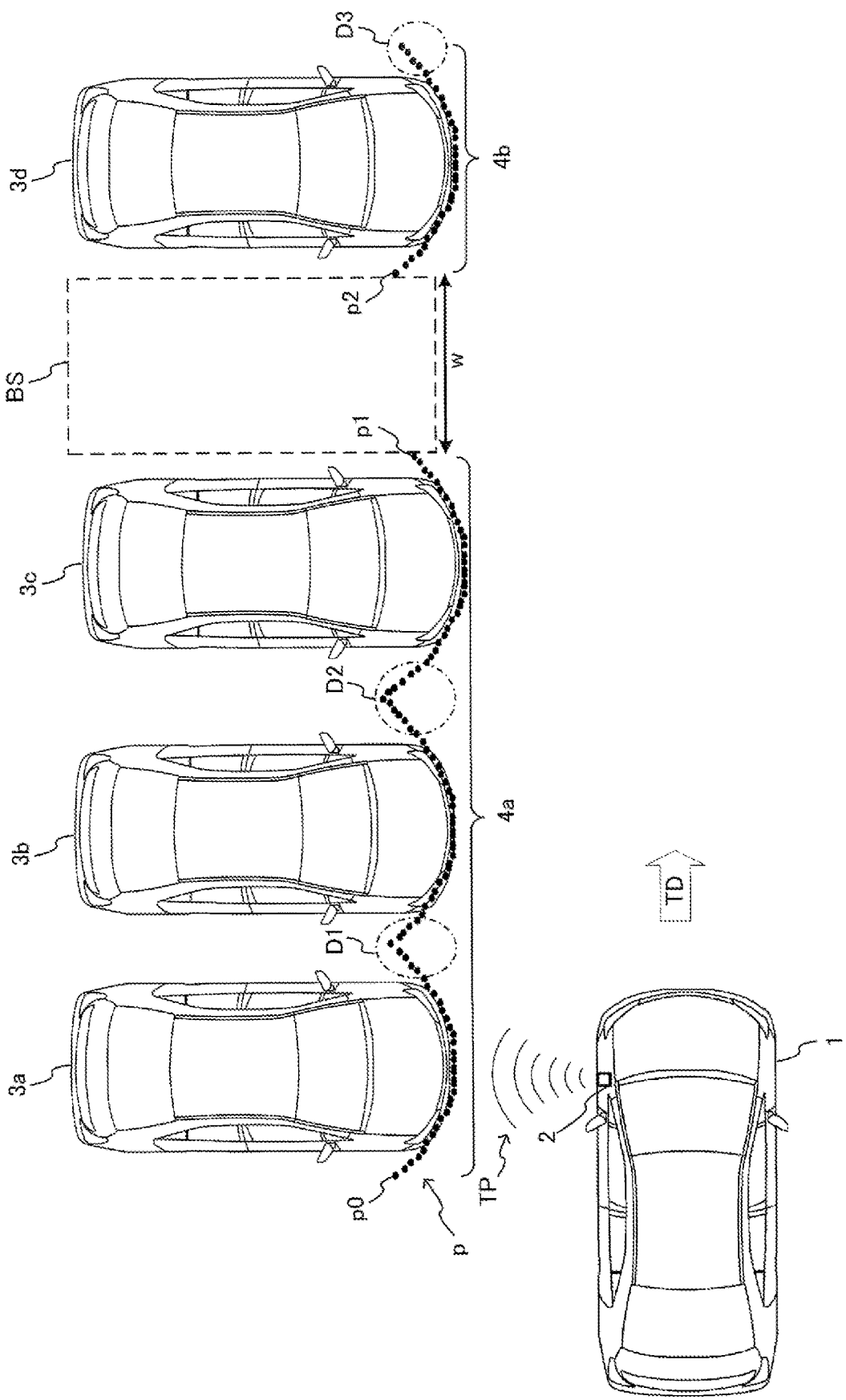
FIG. 3 is a view from directly above illustrating a state in which the vehicle shown in FIG. 1 is searching for an empty space in a parking lot.

Hereinafter, reference is made to FIG. 3, as appropriate, for describing detector 12 and determiner 13. FIG. 3 is a view from directly above illustrating a state in which vehicle 1 shown in FIG. 2 is searching for an empty space (a parking space that is unoccupied, vacant, or available) in a parking lot. FIG. 3 shows, as an example, a case in which vehicle 1 searches for empty space BS while vehicle 1 is moving slowly in a traveling direction (the direction indicated by arrow TD) in front of parked vehicles 3a to 3d that are end-on-parked (perpendicular-parked). Empty space BS in FIG. 3 is a parking space in which one vehicle can be end-on-parked. Parked vehicle 3d and parked vehicles 3a to 3c are two parked vehicle groups adjacent to empty space BS, which is located between the two parked vehicle groups.

Based on the reception signal received from receiving circuit 30, detector 12 detects points p shown in FIG. 3 as detection points of an obstacle that reflects ultrasonic waves (the points p are hereinafter referred to as detection points p). In other words, points p are detection points of reflection positions of the reflected wave. Note that in FIG. 3, the points represented by black dots corresponds to detection points p.

Because the detection process of each of detection points p is well known, the detailed description thereof will be omitted. For example, first, detector 12 calculates a distance based on the speed of transmission wave TP and the time between transmission of transmission wave TP and reception of the reflected wave. Then, detector 12 determines the position that is at the calculated distance away from ultrasonic sensor 2 to be detection point p of the obstacle that reflects the ultrasonic waves. As shown in FIG. 3, a plurality of detection points p are detected. In FIG. 3, detection point p0 is the detection point that is detected first (i.e., detection starting point). Then, detector 12 temporarily stores the plurality of detection points p.

Moreover, detector 12 detects (recognizes) an aggregate of the plurality of detection points p. Hereinafter, the aggregate of a plurality of detection points p is referred to as a "detection point group". In the case of FIG. 3, for example, detector 12 detects detection point group 4a and detection point group 4b.

As illustrated in FIG. 3, in detection point group 4a, for example, depression shape (hereinafter simply referred to as "depression") D1 is formed corresponding to the gap between parked vehicle 3a and parked vehicle 3b, and depression D2 is formed corresponding to the gap between parked vehicle 3b and parked vehicle 3c. In other words, in contour pattern 4a, depression shape (i.e., depression) D1 is formed corresponding to the space between parked vehicle 3a and parked vehicle 3b, and depression D2 is formed corresponding to the space between parked vehicle 3b and parked vehicle 3c. Note that the term "contour pattern" means the pattern of a detection point group.

The reason why depressions D1 and D2 are formed as described above is that, because ultrasonic sensor 2 has wide directivity, a detection point is generated as long as the gap between parked vehicles is narrow to a certain degree, even if there is no obstacle between the parked vehicles. Note that the left end and the right end of each of detection point groups 4a and 4b are handled as depressions (for example, depression D3 shown in FIG. 3).

Determiner 13 calculates width w of empty space BS based on detection points p contained in detection point groups 4a and 4b. In the example of FIG. 3, determiner 13 calculates width w of empty space BS based on the position of detection point p1 that is an end point of detection point group 4a and the position of detection point p2 that is an end point of detection point group 4b. In other words, determiner 13 calculates width w of empty space BS based on the positions of respective end points p1 and p2 of two contour patterns 4a and 4b. As described above, determiner 13 calculates width w of empty space BS based on the distance (the shortest distance) between contour patterns 4a and 4b.

In addition, determiner 13 determines whether or not the calculated width w is within a predetermined range. The minimum value of the predetermined range referred to herein is, for example, the total value of the vehicle width of one vehicle and a predetermined gap between end-on-parked vehicles (for example, a gap that allows the user to open and close a vehicle door). More specifically, the minimum value is 2.5 m, for example. The maximum value of the predetermined range referred to herein is, for example, the total value of the vehicle length of one vehicle and a predetermined gap necessary for parallel parking between two parallel parked vehicles. More specifically, the maximum value is 5 m, for example.

If width w is less than the minimum value of the predetermined range, determiner 13 determines that the parking space for a standard-sized car is not empty because a vehicle having a width significantly narrower than that of the standard-sized car, for example, a light car or a large-sized bike occupies the parking space. Alternatively, determiner 13 determines that empty space BS is not available because a large-sized car occupies a parking space next to empty space BS. If width w is equal to or greater than the minimum value of the predetermined range and less than the maximum value of the predetermined range, determiner 13 determines that empty space BS is an end-on parking space (a perpendicular parking space).

On the other hand, if width w is greater than or equal to the maximum value of the predetermined range, determiner 13 recognizes the pattern of each of detection point groups (hereinafter referred to as a detection point group pattern). The detection point group pattern may be referred to as a contour pattern. Determiner 13 performs, for example, calculation of the length of a detection point group, detection of depressions in the detection point group, calculation of depression interval, and calculation of depression angle, as the recognition of the detection point group pattern. In other words, determiner 13 calculates the length of the contour pattern, detects depressions in the contour pattern, calculates depression interval, and calculates depression angle. The following describes examples of these processes.

Figure 4:
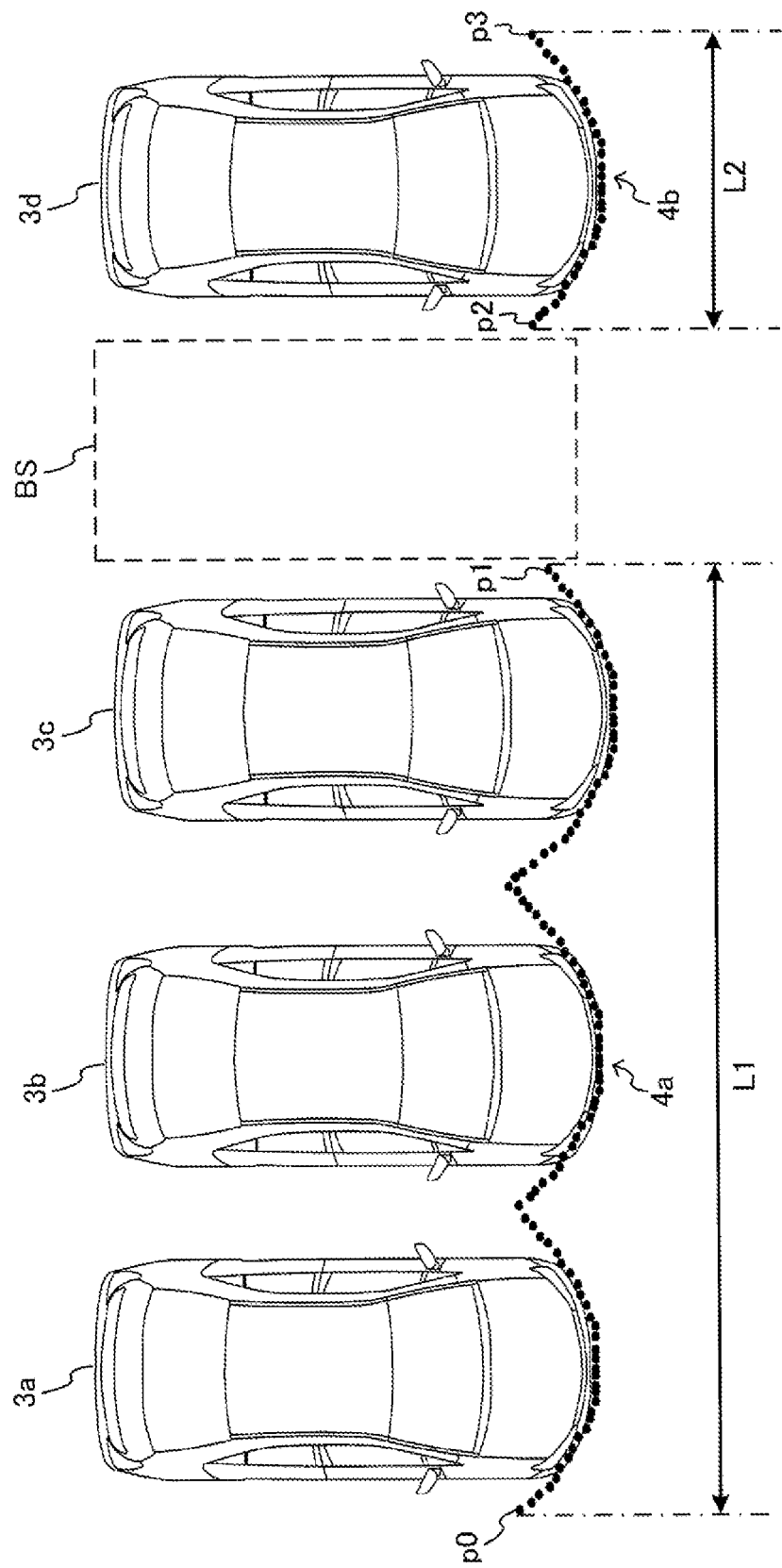
FIG. 4 is a view illustrating an example of lengths of detection point groups.

First, an example of calculation of the length of a detection point group will be described with reference to FIG. 4. In FIG. 4, the same elements as those shown in FIG. 3 are designated by the same reference signs as those used in FIG. 3 (the same applies to FIG. 5 and thereafter).

Determiner 13 calculates respective lengths of detection point group 4a and detection point group 4b, which are located on left and right sides of empty space BS, respectively. In the case of FIG. 4, for example, determiner 13 detects length L1 of detection point group 4a and length L2 of detection point group 4b.

For example, determiner 13 calculates the shortest distance connecting the position of detection point p0, which is one of the end points of detection point group 4a, and the position of detection point p1, which is the other one of the end points of detection point group 4a, as illustrated in FIG. 4. This shortest distance is length L1 of detection point group 4a.

As illustrated in FIG. 4, determiner 13 also calculates the shortest distance connecting the position of detection point p2, which is one of the end points of detection point group 4b, and the position of detection point p3, which is the other one of the end points of detection point group 4b. This shortest distance is length L2 of detection point group 4b.

Thus, an example of calculation of the length of a detection point group has been described above.

Next, an example of detection of depressions in a detection point group will be described with reference to FIG. 5.

Determiner 13 detects depressions D1 and D2 in detection point group 4a.

Figure 5:
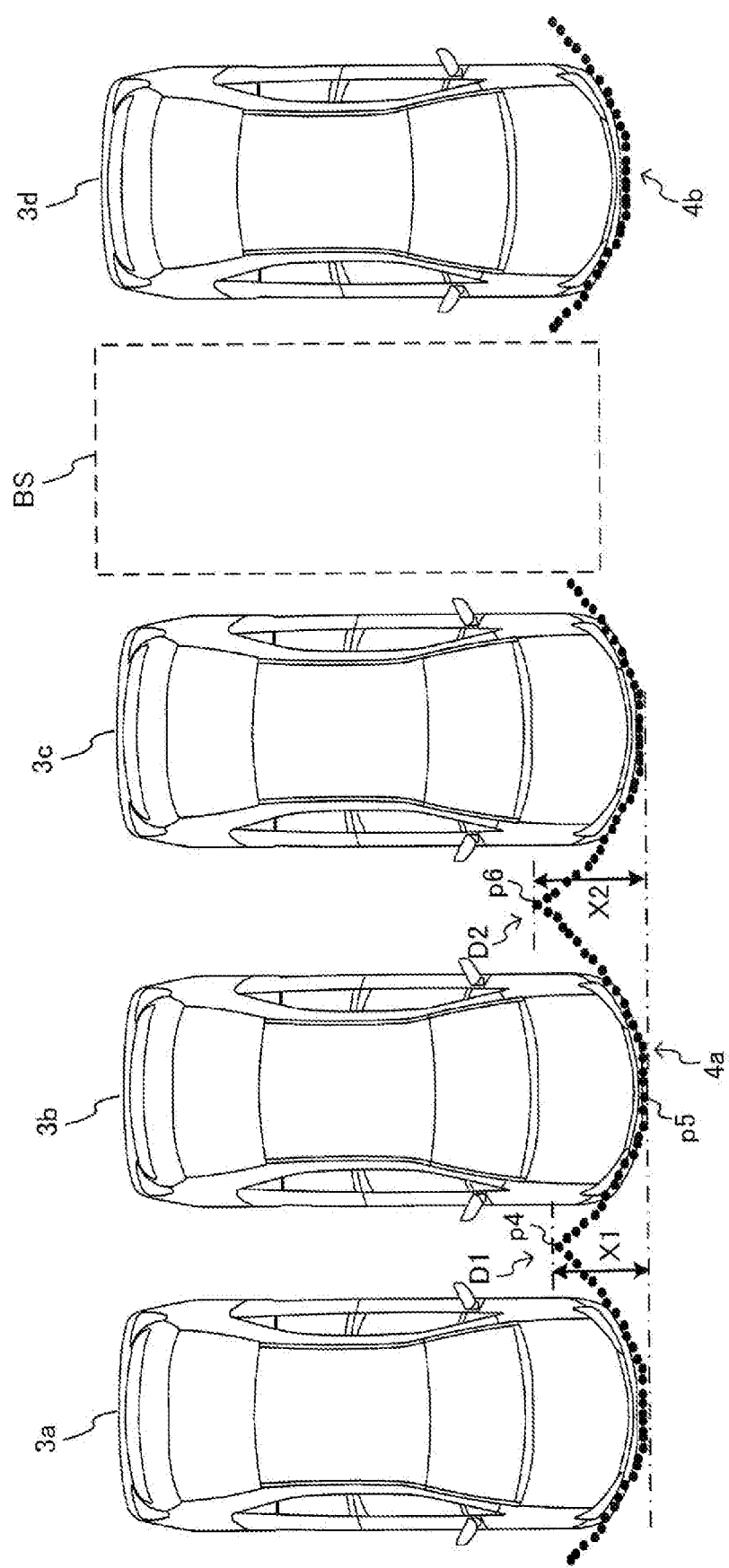
FIG. 5 is a view illustrating an example of depressions in one of the detection point groups.

For example, determiner 13 calculates shortest distance X1 between the position of detection point p4 and the position of detection point p5 along a vehicle longitudinal direction of the parked vehicles, as illustrated in FIG. 5. Detection point p4 is, for example, located most rearward in the vehicle longitudinal direction among the detection points located between parked vehicle 3a and parked vehicle 3b. Detection point p5 is, for example, located most frontward in the vehicle longitudinal direction among the detection points contained in detection point group 4a.

Then, determiner 13 determines whether or not the calculated distance X1 is greater than or equal to a predetermined value (for example, 20 cm). If X1 is greater than or equal to the predetermined value, determiner 13 determines that the plurality of detection points located between parked vehicle 3a and parked vehicle 3b is depression D1 (see also FIG. 3). If X1 is less than the predetermined value, it is not determined that the plurality of detection points between the parked vehicles is a depression.

Also, for example, determiner 13 calculates shortest distance X1 between the position of detection point p6 and the position of detection point p5 along the vehicle longitudinal direction of the parked vehicles, as illustrated in FIG. 5. Detection point p6 is, for example, located most rearward in the vehicle longitudinal direction among the detection points located between parked vehicle 3b and parked vehicle 3c. Detection point p5 is as described above.

Then, determiner 13 determines whether or not the calculated distance X2 is greater than or equal to a predetermined value (for example, 20 cm). If X2 is greater than or equal to the predetermined value, determiner 13 determines that the group of detection points located between parked vehicle 3b and parked vehicle 3c is depression D2 (see also FIG. 3). If X2 is less than the predetermined value, it is not determined that the plurality of detection points between the parked vehicles is a depression.

Note that if, for example, the vehicle longitudinal direction of the parked vehicles is unknown, it is possible to use a direction perpendicular to the vehicle longitudinal direction of vehicle 1, which is provided with ultrasonic sensor 2, within the horizontal plane, in place of the vehicle longitudinal direction of the parked vehicles.

Thus, an example of detection of depressions of a detection point group has been described above.

Next, an example of calculation of depression interval will be described with reference to FIG. 6.

Determiner 13 detects distance (depression interval) Y between depression D1 and depression D2, which are detected in detection point group 4a.

Figure 6:
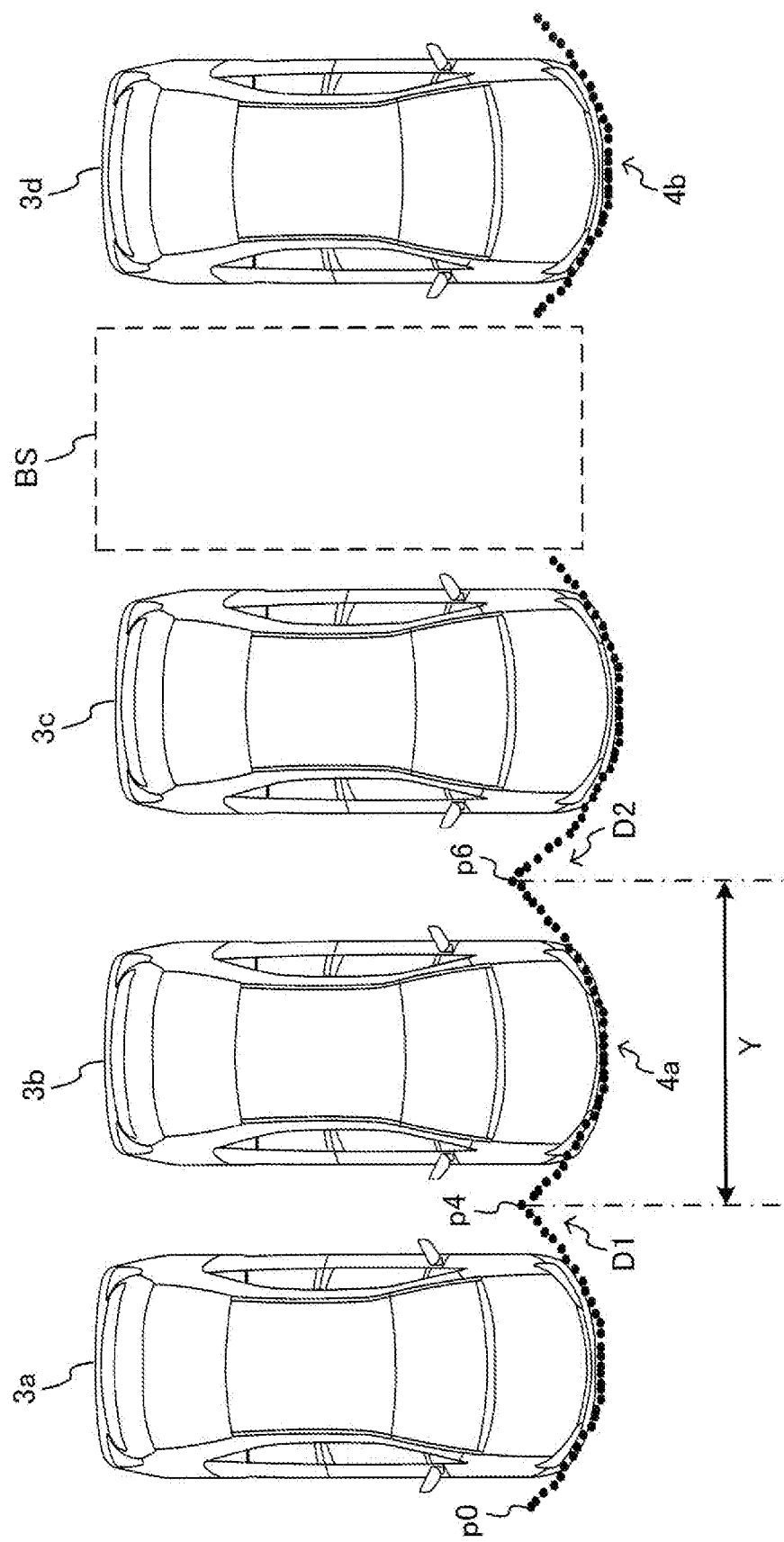
FIG. 6 is a view illustrating an example of depression interval.

For example, determiner 13 calculates the shortest distance connecting the position of detection point p4, which is contained in depression D1, and the position of detection point p6, which is contained in depression D2, as illustrated in FIG. 6. This shortest distance is depression interval Y between depression D1 and depression D2. Note that detection points p4 and p6 are the same as those shown in FIG. 5. Although the calculation of depression interval Y between depression D1 and depression D2 is described as an example herein, another depression interval Y between other depressions may be calculated in a similar manner. For example, the shortest distance connecting detection point p0, which is the detection starting point, and detection point p4 may be calculated as depression interval Y.

Thus, an example of calculation of depression interval has been described above.

Next, an example of calculation of depression angle will be described with reference to FIG. 7.

Determiner 13 calculates depression angle Z regarding depression D2.

Figure 7:
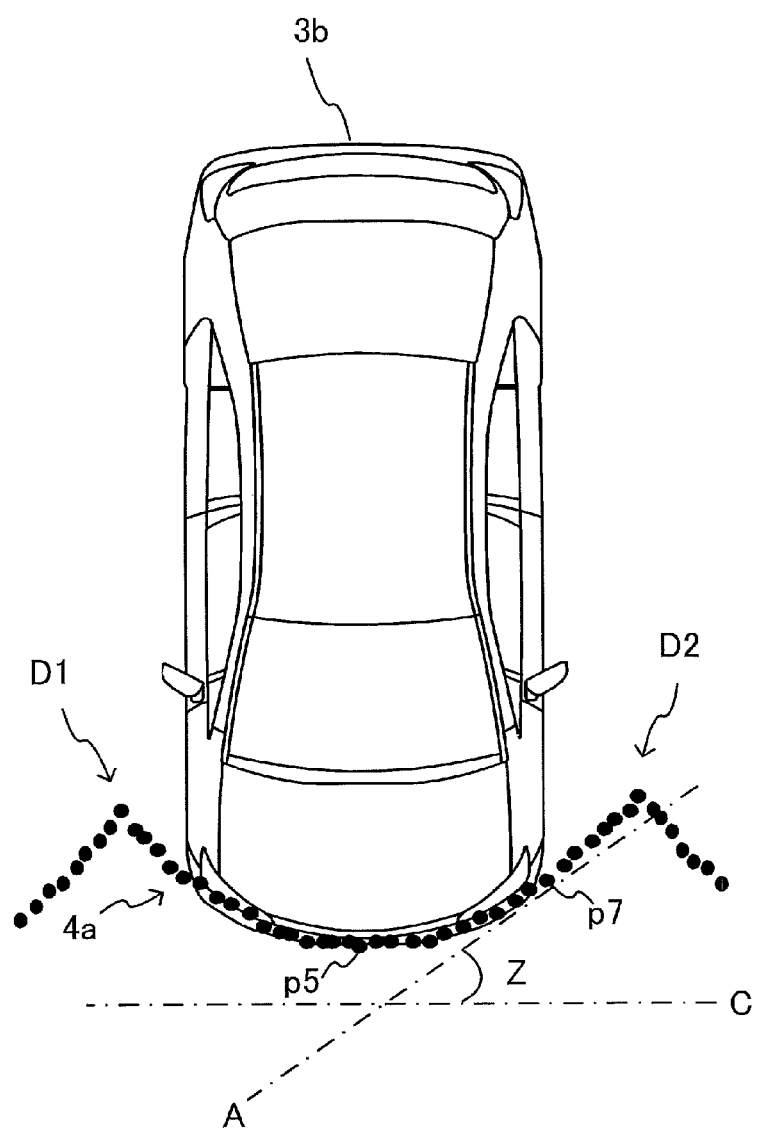
FIG. 7 is a view illustrating an example of depression angle.

For example, determiner 13 calculates depression angle Z formed by imaginary line A and imaginary line C, as illustrated in FIG. 7. For example, imaginary line A is a tangent at detection point p7. Detection point p7 is, for example, about half the vehicle width away from detection point p5, which is located most vehicle frontward in the detection point group 4a. Imaginary line C is a straight line parallel to the vehicle width direction of parked vehicle 3b. In other words, imaginary line C is a straight line parallel to a direction along which the two parked vehicle groups are disposed, or a straight line parallel to a direction along which depressions D1 and D2 are disposed.

Although the calculation of depression angle Z regarding depression D2 has been described as an example herein, another depression angle regarding another depression (for example, depression D1) may be calculated in a similar manner.

Thus, an example of calculation of depression angle has been described above.

Determiner 13 determines whether or not the conditions for end-on parking (perpendicular parking) are satisfied based on the detection point group pattern that is recognized in the above-described manner. If the conditions for end-on parking are satisfied, determiner 13 determines that empty space BS is an end-on parking space. On the other hand, if the conditions for end-on parking are not satisfied, determiner 13 determines that empty space BS is a parallel parking space.

An example of the type determination process will be described below.

For example, the following conditions 1 to 3 are set in advance as the conditions for end-on parking.

[Condition 1] The lengths of detection point groups on the left and right sides of empty space BS are both less than a predetermined value (the smaller one of the vehicle length for one vehicle and the vehicle width for two vehicles, e.g., 5 m, which is an example of the first threshold value).

[Condition 2] The depression interval is less than a predetermined value (the total value of the vehicle length for one vehicle and a predetermined gap necessary for parallel parking between two parallel parked vehicles, e.g., 6.7 m, which is an example of the second threshold value).

[Condition 3] The depression angle is within a predetermined range (an angle at left or right portion of the front or the rear of a vehicle viewed from directly above, for example, from 5° to 20°).

Determiner 13 makes a determination for each of conditions 1 to 3, for example, in the following manner.

First, determiner 13 makes a determination as to whether or not condition 1 is satisfied based on the calculated lengths of the detection point groups on both left and right sides of empty space BS (hereinafter referred to as a first condition determination process).

For example, determiner 13 determines whether or not both length L1 of detection point group 4a and length L2 of detection point group 4b shown in FIG. 4 are less than a predetermined value.

If the lengths of the detection point groups on the left and right sides are both less than the predetermined value, determiner 13 determines that condition 1 is satisfied and that empty space BS is an end-on parking space.

On the other hand, if any of the lengths of the detection point groups on the left and right sides is greater than or equal to the predetermined value (for example, if length L1 is greater than or equal to the predetermined value), determiner 13 determines that condition 1 fails to be satisfied.

If it is determined that condition 1 has failed to be satisfied, determiner 13 subsequently makes a determination as to whether or not condition 2 is satisfied, based on the calculated depression interval (hereinafter referred to as a second condition determination process).

For example, determiner 13 determines whether or not depression interval Y shown in FIG. 6 is less than a predetermined value.

If the depression interval is less than the predetermined value, determiner 13 determines that condition 2 is satisfied and that empty space BS is an end-on parking space.

On the other hand, if the depression interval is greater than or equal to the predetermined value, determiner 13 determines that condition 2 fails to be satisfied.

If it is determined that condition 2 fails to be satisfied, determiner 13 subsequently makes a determination as to whether or not condition 3 is satisfied, based on the calculated depression angle (hereinafter referred to as a third condition determination process).

For example, determiner 13 determines whether or not depression angle Z shown in FIG. 7 is within a predetermined range, inclusive.

If the depression angle is within the predetermined range, determiner 13 determines that condition 3 is satisfied and that empty space BS is an end-on parking space.

On the other hand, if the depression angle is outside the predetermined range, determiner 13 determines that condition 3 fails to be satisfied, and that empty space BS is a parallel parking space.

Thus, an example of determination for conditions 1 to 3 has been described above.

Although the foregoing description illustrates an example in which the first condition determination process is performed at first, determiner 13 may perform at least one of the second condition determination process and the third condition determination process without performing the first condition determination process. In a case where only the second condition determination process is performed, empty space BS may be determined to be a parallel parking space if the second condition is not satisfied. Also, in a case where only the third condition determination process is performed, empty space BS may be determined to be a parallel parking space if the third condition is not satisfied.

Although the foregoing description illustrates an example in which the third condition determination process is performed after the second condition determination process, determiner 13 may perform the second condition determination process after the third condition determination process. In this case, the second condition determination process may be performed if the third condition is not satisfied. Then, if the second condition is not satisfied, empty space BS may be determined to be a parallel parking space.

Although the foregoing description illustrates an example in which determiner 13 determines empty space BS is an end-on parking space if condition 1 is satisfied, determiner 13 may perform at least one of the second condition determination process and the third condition determination process even when condition 1 is satisfied. This further improves the accuracy of the determination.

Thus, an example of the type determination process has been described above.

Determiner 13 generates instruction information (for example, information containing instruction of deceleration, instruction of steering angle, and the like) used for controlling vehicle 1 when vehicle 1 is parked into empty space BS in accordance with the determined type of the empty space (end-on parking space or parallel parking space), and outputs the instruction information to a predetermined device. The predetermined device may be, for example, vehicle ECU (Electronic Control Unit) 60 shown in FIGS. 9 and 10, which will be described later. Vehicle ECU 60 performs controlling of a parking maneuver of vehicle 1 (for example, autonomous driving control) based on instruction information.

Note that determiner 13 may output determination result information indicating the type of the empty space to the predetermined device without performing the generation of the instruction information.

Thus, the configuration of parking control device 100 has been described above.

Figure 8:
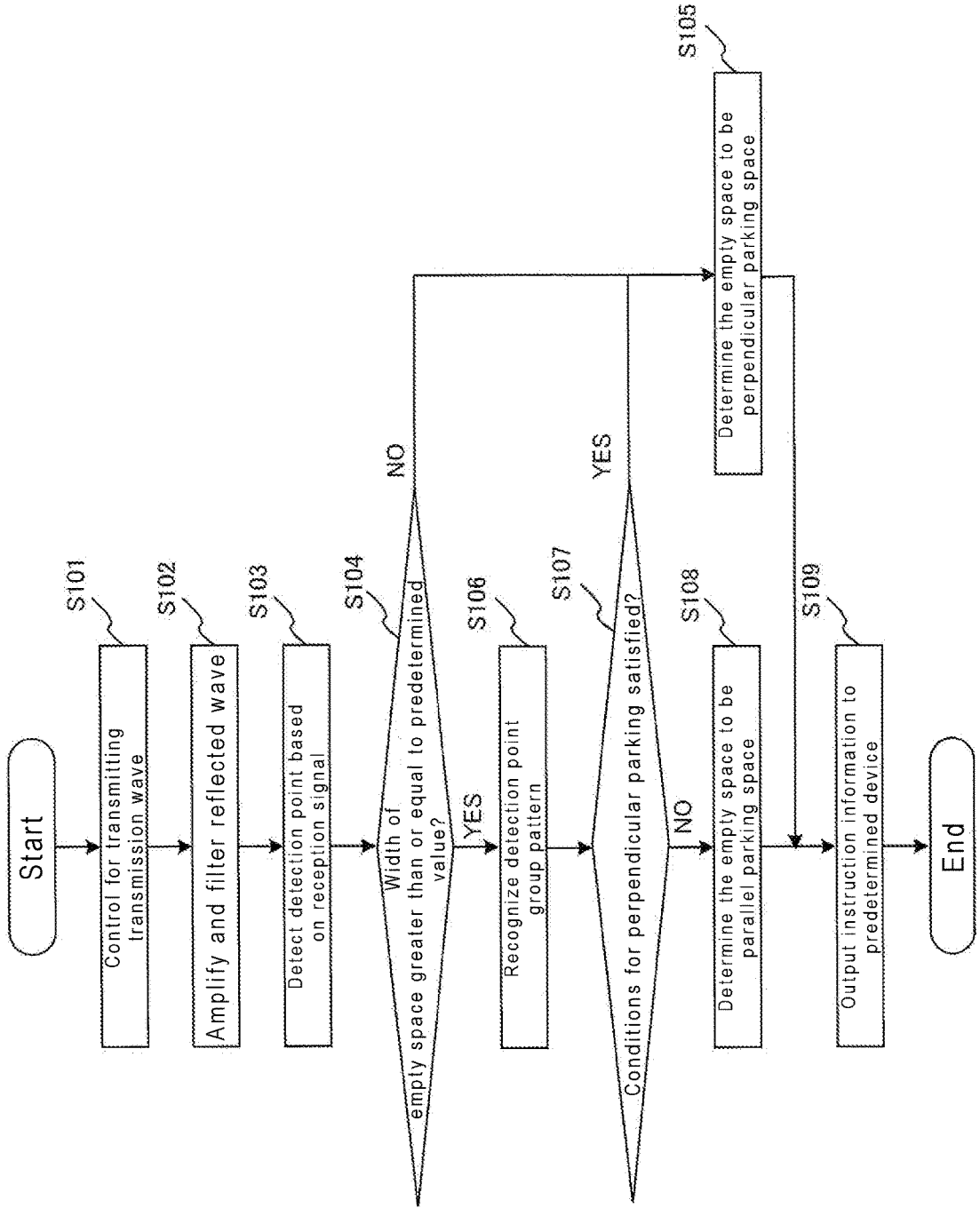
FIG. 8 is a flowchart illustrating an example of an operation of a parking control device according to the exemplary embodiment of the present disclosure.

Next, the operation of parking control device 100 will be described with reference to FIG. 8. FIG. 8 is a flowchart illustrating an example of the operation of parking control device 100. The flow shown in FIG. 8 is performed when vehicle 1 searches for empty space BS while vehicle 1 is moving slowly in front of parked vehicles 3a to 3d that are end-on-parked.

First, transmitting circuit 20 controls ultrasonic sensor 2 so as to transmit transmission wave TP (step S101). Thus, ultrasonic sensor 2 transmits transmission wave TP from a side of vehicle 1, as illustrated in FIGS. 2 and 3.

Next, receiving circuit 30 amplifies and filters an electric signal (reception signal) that is the information of the reflected wave and is received from ultrasonic sensor 2 (step S102). Then, receiving circuit 30 outputs the filtered reception signal to controller 10.

Next, detector 12 of controller 10 detects detection points p shown in FIG. 3 based on the reception signal received from receiving circuit 30 (step S103). Then, detector 12 stores detection point groups (for example, detection point groups 4a and 4b) each including a plurality of detection points p.

The above-described steps S101 to S103 are performed repeatedly while vehicle 1 is searching for empty space BS (for example, while vehicle 1 is traveling).

Determiner 13 calculates width w of empty space BS based on detection points p and determines whether or not width w is greater than or equal to a predetermined value (step S104).

If width w is less than the predetermined value (step S104: NO), determiner 13 determines that empty space BS is an end-on parking space (step S105).

On the other hand, if width w is equal to or greater than the predetermined value (step S104: YES), determiner 13 recognizes a detection point group pattern (step S106). As already described above, the detection point group pattern may be, for example, the length of the detection point group pattern, the depression interval, or the depression angle.

Determiner 13 determines whether or not predetermined conditions for end-on parking are satisfied based on the recognized detection point group pattern (step S107). For example, determiner 13 may perform at least two processes of the above-described first to third condition determination processes, only the second condition determination process, or only the third condition determination process.

If the conditions for end-on parking are satisfied (step S107: YES), determiner 13 determines that empty space BS is an end-on parking space (step S105).

On the other hand, if the conditions for end-on parking are not satisfied (step S107: NO), determiner 13 determines that empty space BS is a parallel parking space (step S108).

Determiner 13 generates instruction information according to the type of empty space determined in step S105 or step S108, and outputs the instruction information to a predetermined device (step S109).

Note that determiner 13 may be configured to output a determination result to a device for displaying the result for the user or notifying the user of the result, such as a display or a loudspeaker, before the instruction information is output to the predetermined device at step S109, and to accept selection as to whether or not the determination result is desired by the user. This complements the accuracy of the determination result made by determiner 13.

Thus, the operation of parking control device 100 has been described above.

Figure 9:
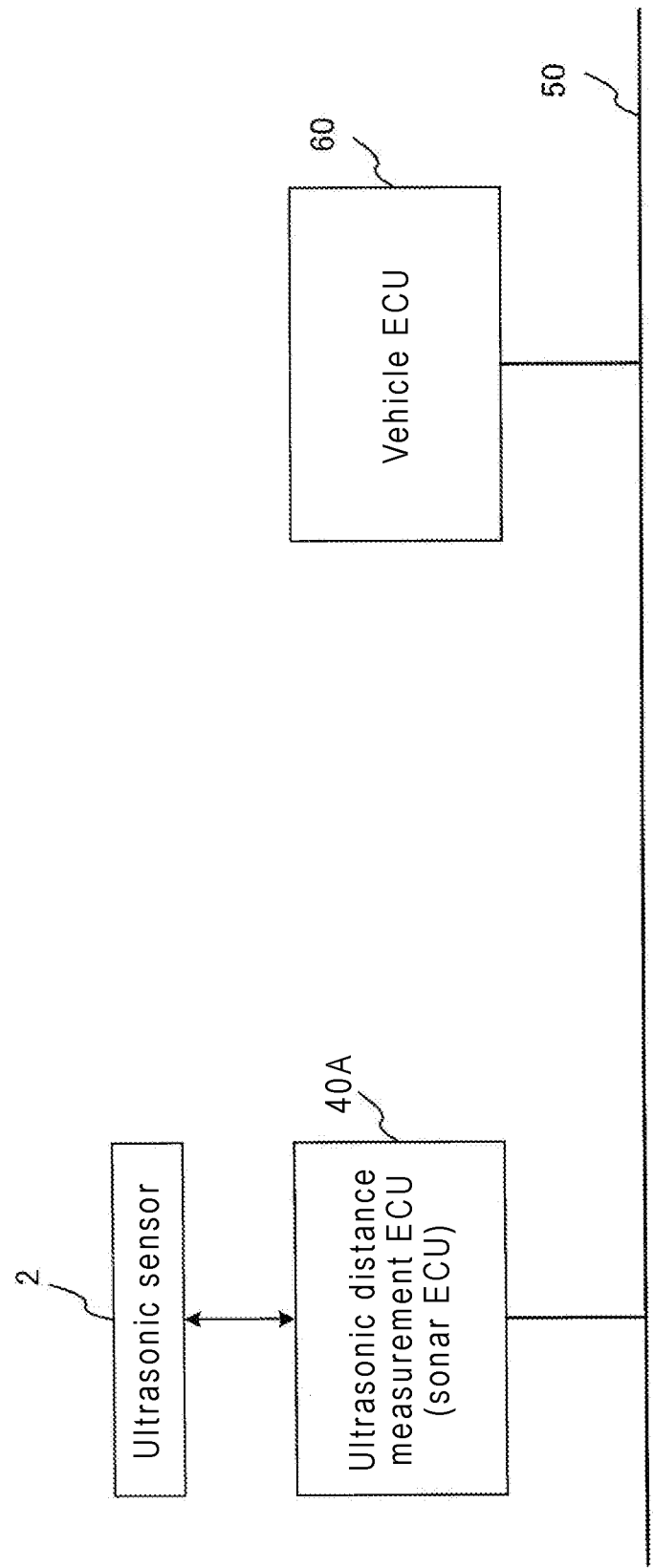
FIG. 9 is a view for illustrating a first example of application of the parking control device according to the exemplary embodiment of the present disclosure.

Next, an example of application of the above-described parking control device 100 will be described with reference to FIGS. 9 and 10.

Parking control device 100 may be applied to, for example, ultrasonic distance measurement ECU (also referred to as a sonar ECU) 40A. Ultrasonic distance measurement ECU 40A is connected to vehicle ECU 60 that controls driving of the vehicle via CAN (Controller Area Network) 50. Vehicle ECU 60 is a vehicle controller that controls at least a traveling direction and a speed of vehicle 1.

In this case, ultrasonic distance measurement ECU 40A outputs, to vehicle ECU 60, instruction information generated in accordance with the type of empty space BS as described above. Vehicle ECU 60 controls a maneuver of vehicle 1 for parking vehicle 1 into empty space BS based on the instruction information.

Figure 10:
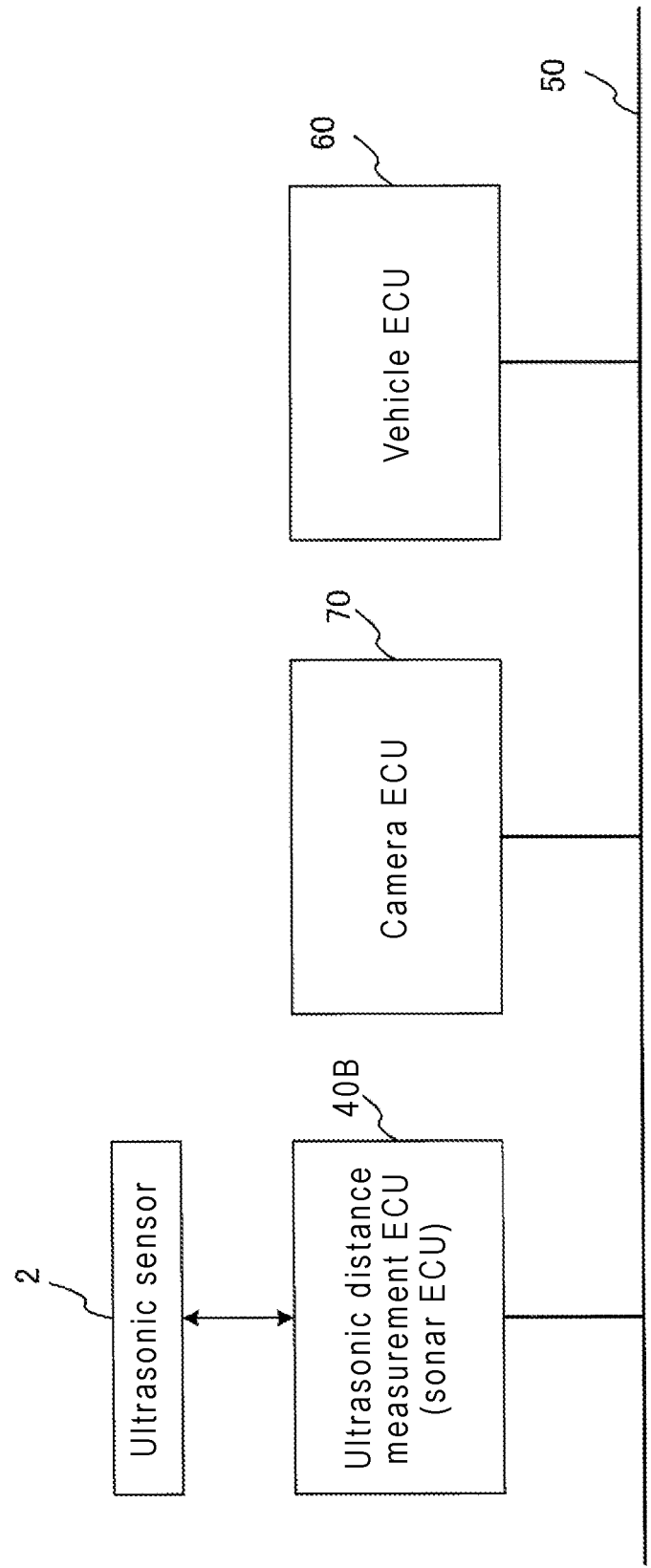
FIG. 10 is a view for illustrating a second example of application of the parking control device according to the exemplary embodiment of the present disclosure.

Alternatively, parking control device 100 may be applied to, for example, ultrasonic distance measurement ECU 40B and be used together with, for example, camera ECU 70 shown in FIG. 10. Camera ECU 70 is connected to ultrasonic distance measurement ECU 40B and vehicle ECU 60 via CAN (Controller Area Network) 50.

In this case, camera ECU 70 receives detection result information (for example, information indicating positions of parked vehicles, the position of an empty space, and the like) from ultrasonic distance measurement ECU 40B, and generates instruction information based on the detection result information and a result of imaging (for example, an image of empty space BS, an image of parked vehicles adjacent to empty space BS, and the like). Then, camera ECU 70 outputs the instruction information to vehicle ECU 60. Vehicle ECU 60 controls a maneuver of vehicle 1 in parking vehicle 1 into empty space BS based on the instruction information.

Thus, examples of application of parking control device 100 have been described above. As described above, parking control device 100 may output a determination result indicating whether empty space BS is the end-on parking space or the parallel parking space to a device that generates instruction information to be used for controlling vehicle 1 when vehicle 1 parks into empty space BS. Alternatively, parking control device 100 may output the instruction information to the vehicle controller (vehicle ECU 60) after generating the instruction based on the determination result.

As has been detailed above, parking control device 100 according to the present embodiment determines whether the empty space is an end-on parking space or a parallel parking space based on a detection point group pattern (for example, the length of a detection point group, the depression interval, or the depression angle) that is obtained when parked vehicles are detected with ultrasonic waves. Thus, parking control device 100 determines the type of the parking space more accurately.

The present disclosure is not limited to the description of the foregoing exemplary embodiment, and various modifications are possible. In the following, modification examples will be described.

Modification Example 1

For example, in addition to the various determination processes described above, determiner 13 may detect the inclination of a parked vehicle. This process may be performed, for example, after step S105 or step S108 shown in FIG. 8. A specific example of this process will be described below with reference to FIGS. 11A and 11B.

Figure 11B:
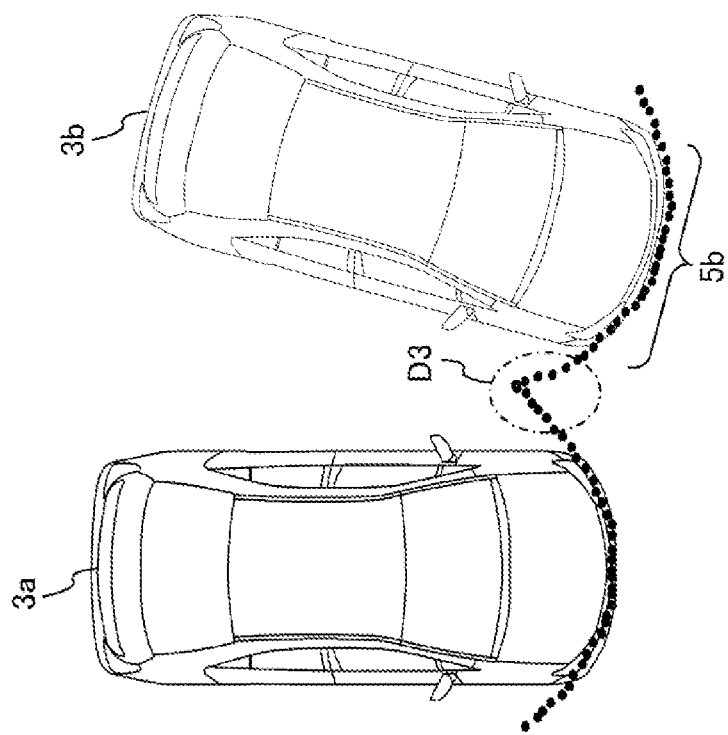
FIG. 11B is a view for illustrating detection of the inclination of a parked vehicle, according to the modification example of the present disclosure.
Figure 11A:
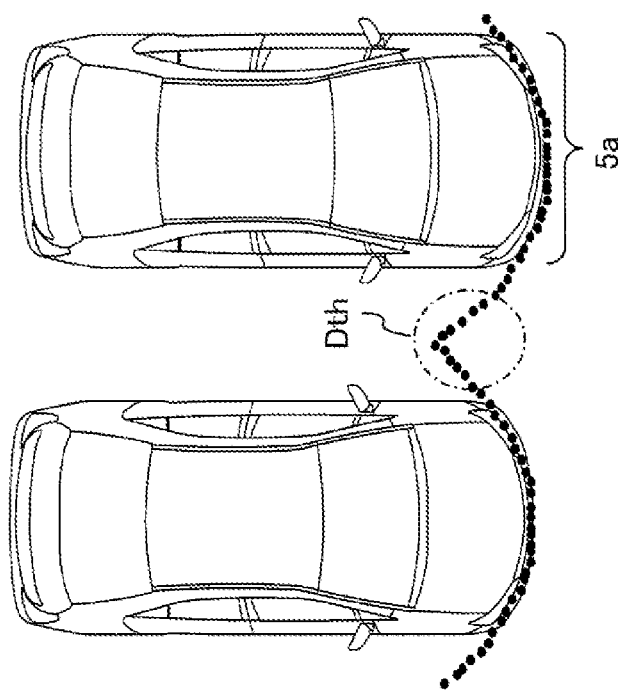
FIG. 11A is a view for illustrating detection of the inclination of a parked vehicle, according to a modification example of the present disclosure.

FIG. 11A shows predetermined depression Dth. FIG. 11B shows depression D3, which is contained in an actually recognized detection point group. Parked vehicle 3b shown in FIG. 11B is adjacent to empty space BS (not shown).

For example, determiner 13 reads out information of depression Dth from a predetermined storage unit (not shown) and compares the shape of depression Dth with the shape of depression D3, to detect whether or not there is a shift (inclination). As illustrated in FIG. 11B, because parked vehicle 3b is parked so as to be inclined, the right-side half of the depression D3 is shifted in comparison to depression Dth. If such a shift is detected, determiner 13 turns portion 5a of the detection point group shown in FIG. 11A so that portion 5a matches portion 5b of the detection point group shown in FIG. 11B, and calculates the angle by which portion 5a is turned. Then, determiner 13 determines parameters to be contained in instruction information, such as steering angle and approaching path, and generates the instruction information.

Thus, according to the present modification example, the inclination (shift angle) of a parked vehicle adjacent to the empty space is detected, based on the shape of a depression in a detection point group and instruction information is generated based on the inclination. Therefore, highly accurate parking assistance is provided.

Modification Example 2

Although the forgoing exemplary embodiments have described examples in which parking control device 100 searches for empty space BS, searching for empty space BS is not essential. More specifically, parking control device 100 may determine whether a space is an end-on parking space or a parallel parking space based on the detection point group pattern even when parking control device 100 is not searching for empty space BS.

Modification Example 3

Figure 12:
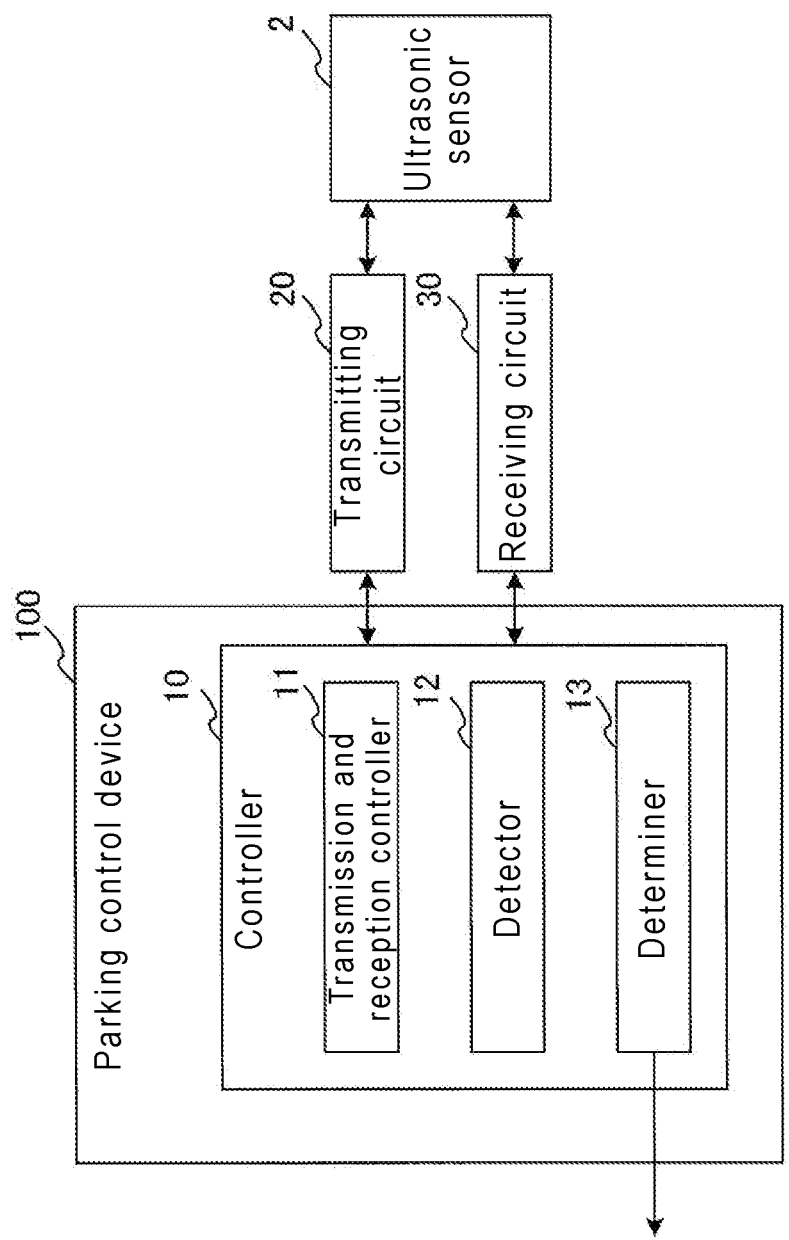
FIG. 12 is a block diagram illustrating an example of the configuration of a parking control device according to a modified example of the present disclosure.

Although the foregoing exemplary embodiments have described examples in which parking control device 100 includes transmitting circuit 20 and receiving circuit 30, as illustrated in FIG. 1, the embodiments are not limited to such an example. For example, transmitting circuit 20 and receiving circuit 30 may be provided external to parking control device 100, as illustrated in FIG. 12. Alternatively, a sensor device including ultrasonic sensor 2, transmitting circuit 20, and receiving circuit 30 may be constructed in FIG. 12.

As described above, the present disclosure is suitable for a parking control device, a parking control method and a parking control program that detect a parking space.

What is claimed is:
1. A parking control device comprising:
a memory that stores instructions; and
a processor that, when executing the instructions stored in the memory, performs operations comprising:
receiving, from an ultrasonic sensor which transmits an ultrasonic wave and receives a reflected wave corresponding to the ultrasonic wave, and is to be mounted to a vehicle, a signal based on the reflected wave;
detecting a detection point group being an aggregate of a plurality of detection points of reflection positions of the reflected wave, based on the signal;
determining whether an empty parking space between two parked vehicle groups adjacent to the empty parking space is an end-on parking space or a parallel parking space, based on a position of at least one depression shape in at least one contour pattern being a pattern of the detection point group; and
outputting a determination result indicating whether the empty parking space is the end-on parking space or the parallel parking space to a device that generates an instruction to be used for controlling the vehicle when the vehicle parks into the empty parking space, or outputting the instruction to a vehicle controller that controls at least a traveling direction and a speed of the vehicle after generating the instruction based on the determination result, wherein the at least one contour pattern includes a first contour pattern and a second contour pattern detected on left and right sides of the empty parking space, respectively, the at least one depression shape includes a first depression shape and a second depression shape in the first contour pattern, and when determining whether the empty parking space is the end-on parking space or the parallel parking space, the processor:

calculates a width of the empty parking space based on a distance between the first contour pattern and the second contour pattern;

determines that the empty parking space is the end-on parking space when the width of the empty parking space is equal to or greater than a minimum value of a first predetermined range and less than a maximum value of the first predetermined range;

calculates a depression interval when the width of the empty parking space is greater than or equal to the maximum value of the first predetermined range, the depression interval being shortest distance between a peak position of the first depression shape and a peak position of the second depression shape in the first contour pattern;

determines that the empty parking space is the end-on parking space when the depression interval is less than a first threshold value; and determines that the empty parking space is the parallel parking space when the depression interval is greater than or equal to the first threshold value.

2. The parking control device according to claim 1, when determining whether the empty parking space is the end-on parking space or the parallel parking space, the processor further:

calculates respective lengths of the first contour pattern and the second contour pattern;

determines that the empty parking space is the end-on parking space when both of the respective lengths of the first contour pattern and the second contour pattern are less than the first threshold value;

calculate the depression interval when at least one of the respective lengths of the first contour pattern and the second contour pattern is greater than or equal to the first threshold value;

determines that the empty parking space is the end-on parking space when the depression interval is less than a second threshold value; and determine that the empty parking space is the parallel parking space when the depression interval is greater than or equal to the second threshold value.

3. The parking control device according to claim 1, when determining whether the empty parking space is the end-on parking space or the parallel parking space, the processor further:

calculates a depression angle formed by a straight line tangent to one of the first depression shape and the second depression shape and a straight line parallel to a direction along which a plurality of depression shapes are disposed, when the width of the empty parking space is greater than or equal to the maximum value of the first predetermined range;

determine that the empty parking space is the end-on parking space when the depression angle is within a second predetermined range, inclusive; and determine that the empty parking space is the parallel parking space when the depression angle is outside the second predetermined range.

4. The parking control device according to claim 1, when determining whether the empty parking space is the end-on parking space or the parallel parking space, the processor further:

calculates respective lengths of the first contour pattern and the second contour pattern;

determines that the empty parking space is the end-on parking space when both of the respective lengths of the first contour pattern and the second contour pattern are less than the first threshold value;

calculates a depression angle formed by a straight line tangent to one of the first depression shape and the second depression shape and a straight line parallel to a direction along which the first depression shape and the second depression shape are disposed, when at least one of the respective lengths of the first contour pattern and the second contour pattern is greater than or equal to the first threshold value;

determines that the empty parking space is the end-on parking space when the depression angle is within a second predetermined range, inclusive; and determine that the empty parking space is the parallel parking space when the depression angle is outside the second predetermined range.

5. The parking control device according to claim 1, wherein, when determining whether the empty parking space is the end-on parking space or the parallel parking space, the processor further calculates an inclination angle of a portion of the at least one contour pattern that is actually detected, with respect to a predetermined contour pattern, and generates the instruction information based on the calculated inclination angle.

6. A parking control method comprising:

receiving a signal based on a reflected wave from an ultrasonic sensor which transmits an ultrasonic wave and receives the reflected wave corresponding to the ultrasonic wave and is to be mounted to a vehicle;

detecting a detection point group being an aggregate of a plurality of detection points of reflection positions of the reflected wave, based on the signal;

determining whether an empty parking space between two parked vehicle groups adjacent to the empty parking space is an end-on parking space or a parallel parking space, based on a position of at least a depression shape in at least a contour pattern being a pattern of the detection point group; and outputting a determination result indicating whether the empty parking space is the end-on parking space or the parallel parking space to a device that generates an instruction to be used for controlling the vehicle when the vehicle parks into the empty parking space, or outputting the instruction to a vehicle controller that controls at least a traveling direction and a speed of the vehicle after generating the instruction based on the determination result, wherein
- the at least one contour pattern includes a first contour pattern and a second contour pattern detected on left and right sides of the empty parking space, respectively,
- the at least one depression shape includes a first depression shape and a second depression shape in the first contour pattern, and
- when determining whether the empty parking space is the end-on parking space or the parallel parking space, the processor:
    - calculates a width of the empty parking space based on a distance between the first contour pattern and the second contour pattern;
    - determines that the empty parking space is the end-on parking space when the width of the empty parking space is equal to or greater than a minimum value of a predetermined range and less than a maximum value of the predetermined range;
    - calculates a depression interval when the width of the empty parking space is greater than or equal to the maximum value of the predetermined range, the depression interval being shortest distance between a peak position of the first depression shape and a peak position of the second depression shape in the first contour pattern;
    - determines that the empty parking space is the end-on parking space when the depression interval is less than a threshold value; and
    - determines that the empty parking space is the parallel parking space when the depression interval is greater than or equal to the threshold value.

* * * * *